(12) United States Patent
Feyrer et al.

(10) Patent No.: US 7,018,160 B2
(45) Date of Patent: Mar. 28, 2006

(54) HANDLING DEVICE FOR REPOSITIONING PARTS

(75) Inventors: Thomas Feyrer, Esslingen (DE); Gerhard Thorwart, Filderstadt (DE); Rainer Armbruster, Filderstadt (DE)

(73) Assignee: Festo AG & Co., Esslingen (DE)

( * ) Notice: Subject to any disclaimer, the term of this patent is extended or adjusted under 35 U.S.C. 154(b) by 39 days.

(21) Appl. No.: 10/808,865

(22) Filed: Mar. 25, 2004

(65) Prior Publication Data

US 2004/0197182 A1  Oct. 7, 2004

(30) Foreign Application Priority Data

Apr. 1, 2003  (DE) ................. 103 14 818

(51) Int. Cl.
*B66C 23/00*  (2006.01)
(52) U.S. Cl. ..................... 414/680; 414/729
(58) Field of Classification Search .......... 414/729, 414/783, 680, 749.1, 751.1, 752.1, 753.1
See application file for complete search history.

(56) References Cited

U.S. PATENT DOCUMENTS 6,851,917 B1 * 2/2005 Feyrer et al. ............ 414/751.1

FOREIGN PATENT DOCUMENTS

| DE | 26 42 490 B1 | 7/1977 |
| DE | 296 18 418 U1 | 1/1997 |
| WO | WO 01/68490 | 9/2001 |

* cited by examiner

*Primary Examiner*—Donald W. Underwood
(74) *Attorney, Agent, or Firm*—Hoffman & Baron, LLP

(57) ABSTRACT

A handling device for repositioning parts having a pivot arm able to be pivoted about a first pivot axis and a handling part adapted to bear a gripper and able to be pivoted with respect to a second pivot axis. The handling part is furthermore carried so that it may be radially moved in relation to the second pivot axis and cooperate by way of a cam follower with a path setting cam having two linear terminal sections. During operation of the device the handling part may move along a handling path, which has two linear terminal sections.

21 Claims, 9 Drawing Sheets

Fig. 23

HANDLING DEVICE FOR REPOSITIONING PARTS

BACKGROUND OF THE INVENTION

The invention relates to a handling device for the repositioning of parts comprising a pivot arm able to be driven by a drive means to perform an oscillating movement about a stationary first pivot axis, a handling part serving for carrying a gripper, which while performing a second pivot movement about a stationary second pivot axis is able to be pivoted and furthermore is able to be set radially in relation to the second pivot axis while performing a linear or straight stroke.

THE PRIOR ART

A handling device disclosed in the German patent publication (utility model) 29,618,418 of this type is utilized for repositioning parts, which are taken up at a first position and shifted to a second position where they are put down after being reorientated through 90°. The respective part to be repositioned is held by a gripper during the repositioning operation, and such gripper is seated on a moving handling part of the handling device and together with same may move along a handling path as is desired.

In the case of the handling device of the said German patent publication (utility model) 29,618,418 the handling section is kinematically coupled by way of a rotary joint with the pivot arm. At any time during a handling cycle moving along the handling path the handling section, and hence the gripper secured to it, perform overlapping and translatory movements. In the case of many handling tasks, as for instance on transferring a pin between two linear holes, there is however a necessity of a purely linear movement for the gripper to take up and put down the part to be repositioned. The known handling device is unsuitable for this purpose.

Although a handling device is described in the patent publication WO 01/68490 A1, in the case of which a handling part having a gripper is adapted to move along a handling path, which has two linear terminal sections, in which the handling part and accordingly the gripper as well performs an exclusively linear stroke, in this case the handling part is unable to change its orientation in space in a handling cycle. The device is consequently unsuitable for changing the alignment of a part to be repositioned during a repositioning operation through an angle of for example 90°.

The German patent publication 2,642,490 B2 discloses apparatus designed to transfer objects with a predetermined spacing apart to a receiving conveyor. The apparatus is provided with a chain, which bears a plurality of suction cups which may be shifted horizontally in order to transfer any desired objects between two conveyor belts as part of a purely linear movement. Suction engagement of the objects takes place when the respective suction cup has its flap closed, and such flap is opened again for depositing the object.

SHORT SUMMARY OF THE INVENTION

Accordingly one object of the present invention is to provide a handling device of the initially described type using which parts may be repositioned when having their alignment changed so that they may be taken up and deposited again with a purely linear movement.

In order to achieve these and/or other objects appearing from the present specification, claims and drawings, in the present invention in a handling device with the initially mentioned features there is a path setting cam extending at least partly around the first pivot axis, and having two linear terminal sections, the handling part being engaged with the path setting cam by means of a cam follower, the cam follower being able to be moved relatively to the pivot arm radially as regards its first pivot axis and the pivot arm so acts, during its first pivoting movement, in a driving manner on the cam follower that same is shifted along the path setting cam and accordingly the handling part moves, during each handling cycle, along a handling path, which has two linear terminal sections, in which the handling part respectively performs exclusively a linear stroke.

In the case of this handling device the kinematics employed permit the maintenance of handling paths in such a manner that a part to be repositioned is changed in its alignment in the course of repositioning and furthermore the lifting and deposit of such part may take place as part of an exclusively linear movement. The course of the desired handling path may be influenced by virtue of design of the path setting cam in order to take into account different repositioning tasks. There is more particularly the possibility of so designing the path setting cam that during a handling cycle the handling part firstly performs a purely linear stroke in a first stroke direction, then a purely pivoting movement or a combined pivoting and translatory movement through for example 90° and finally, again, a purely linear movement which is however in the opposite direction to the direction of the first stroke.

Further advantageous developments of the invention are defined in the claims.

If the two linear terminal sections of the path setting cam extend at a right angle to one another, a part to be repositioned may be lifted or taken up at a first position with an alignment changed by 90° and put down again at a second position.

It is convenient for the longitudinal axes of the two linear terminal sections of the path setting cam to cross at a point which is on the second pivot axis.

It is convenient also for the pivot arm not to directly engage the cam follower but engage an entrainment member arranged on the handling part, the entrainment member being kinematically coupled, in the direction of the first pivoting movement, for producing an entraining connection, there being a relative freedom of movement between the entrainment member and the pivot arm radially of the first pivot axis. The entrainment member may for example be guided in a radially orientated longitudinal slot in the pivot arm.

In the case of a kinematically very simple design the cam followers and the entrainment member lie on a common entraining axis extending in parallelism to the first and the second pivot axis.

On shifting the cam follower along the path setting cam the aim is for the cam follower to be in engagement with the path setting cam free of play athwart the direction of shifting. In order to ensure this a loading device pivoting with the pivot arm may be provided which acts between the pivot arm and the cam follower and which constantly biases the cam follower against a flank of the path setting cam.

In the case of a particularly expedient design the handling part is a component of a pivotally movable handling arm, which in addition to the handling part also has a bearing part. For the location of the second pivot axis the bearing part is pivotally mounted in a stationary manner, the handling part being guided in an adjustable fashion of the bearing part in an exclusively linear manner in order to define the axis of the linear stroke movement. The pivotal movements occurring on the handling path are accordingly in all performed by the handling arm, whereas the linear movements defined by the two linear terminal sections of the path setting cam are exclusively performed by the handling part in relation to the stationary bearing part. Owing to this decoupling a separate design of the pivotal bearing means and of the linear guide means is possible, something which ensures a high degree of accuracy and only minimum wear.

In the case of one possible design of the handling device the path setting cam extends in between the first and the second pivot axis, the first pivot axis being located on the inner side of the curvature and the second pivot axis being on the outer side of the curvature of the path setting cam. Owing to the leverage in this case occurring the desired handling path may be produced with a relatively short path setting cam and accordingly with a relatively small pivot angle of the pivot arm.

More particularly when parts with large masses are to be repositioned or a gripper to be mounted on the handling part is relatively heavy, a design of the handling device is recommended, in the case of which the two pivot axes are on the same side of the path setting cam, the first pivot axis being mounted between the path setting cam and the second pivot axis. The first pivot axis may in this case be more or less completely surrounded by the path setting cam, the second pivot axis being placed in the open region of the path setting cam between the two linear terminal sections. The leverage then tends to be more convenient in this that is to say than with the previously mentioned one, although however a relatively longer path setting cam is necessary so that the pivot arm as well is pivoted during a handling cycle through a larger pivot angle.

In comparison with a design, in which the angle between the two linear terminal sections of the path setting cam, is set for good, be it an angle of 90° or another angle, there are advantages as regards the variability of the possible applications, if the said angle may be reset. It is particularly advantageous if there is a design rendering possible a mutually independent angular resetting of the two linear terminal sections. The setting of a respective angle is preferably performed as part of a pivotal movement, the center of pivoting being on the second pivot axis.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

FIGS. 16 through 20.

show the course of motion during a handling cycle in the case of the handling device of FIGS. 12 through 15.

DETAILED ACCOUNT OF WORKING EMBODIMENTS OF THE INVENTION

The designs of the handling device in accordance with the invention illustrated in drawings respectively render possible a sequential repositioning of parts of any desired type, and more particularly of small parts such as screws, bolts or other parts having a certain longitudinal extent in the drawing such a part to be repositioned is indicated at 2 in chained lines.

Figure 1:
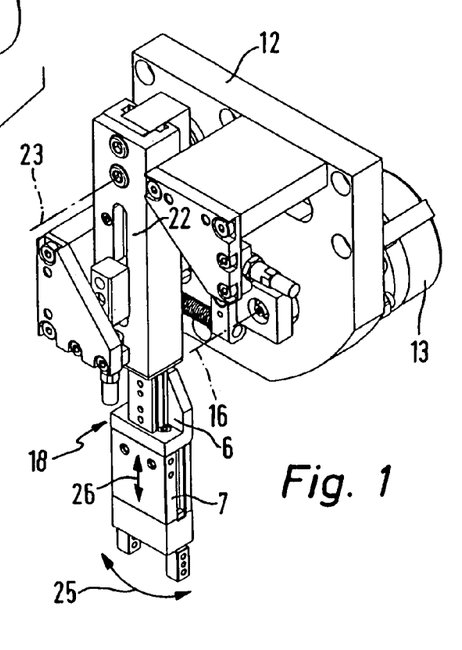
FIG. 1 shows a first possible design of the handling device in accordance with the invention in a perspective elevation.
Figure 2:
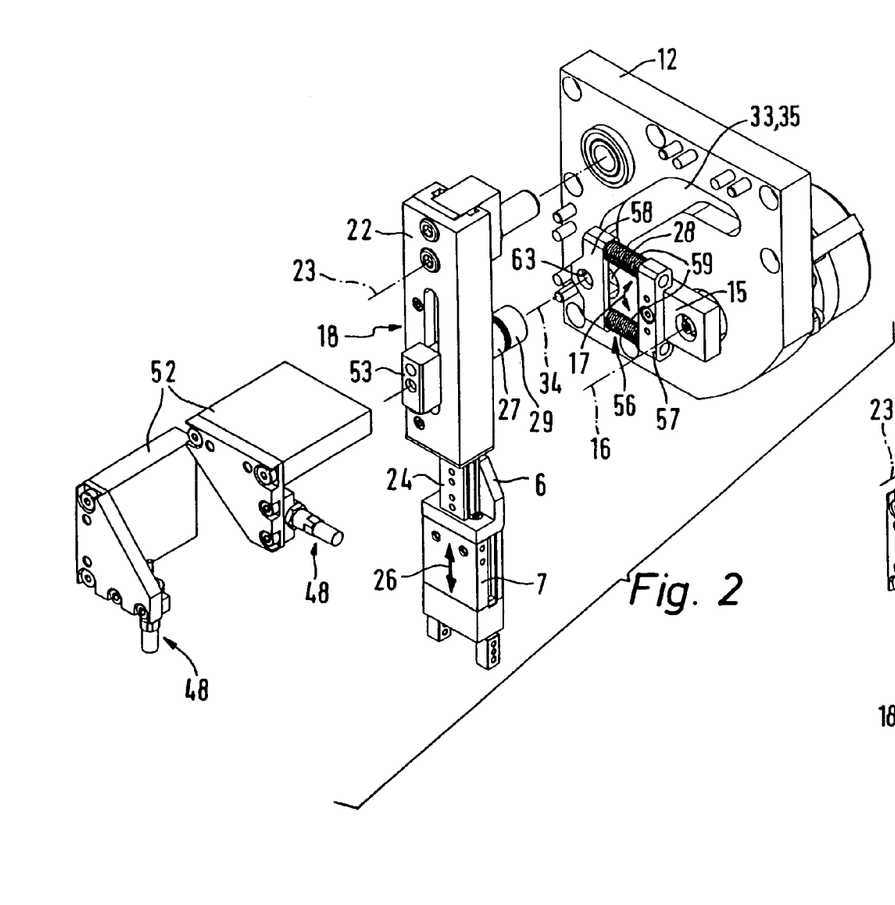
FIG. 2 shows the handling device of FIG. 1 in an exploded view.
Figure 3:
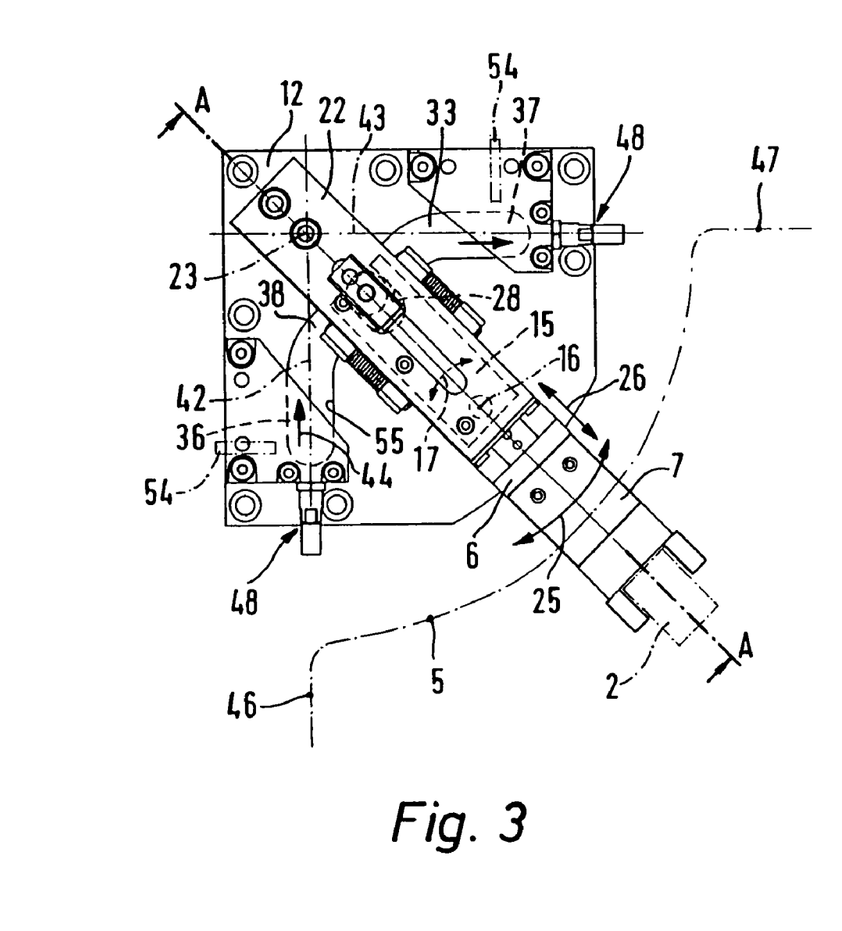
FIG. 3 shows handling device of FIG. 1 is a front view, the handling part having assumed an intermediate position.
Figure 5:
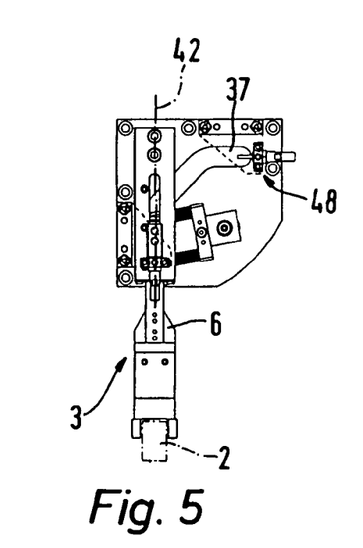
FIGS. 5 through 11 show the course of movements during the performance of a handling cycle by the handling device of FIGS. 1 through 4.
Figure 6:
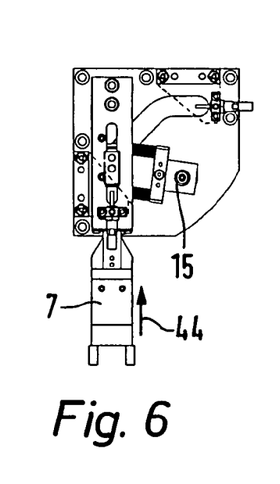
Figure 7:
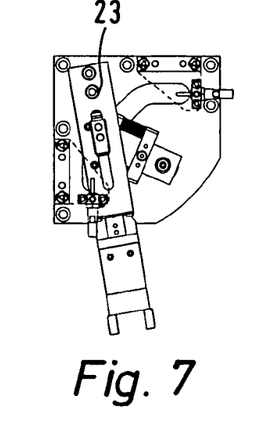
Figure 8:
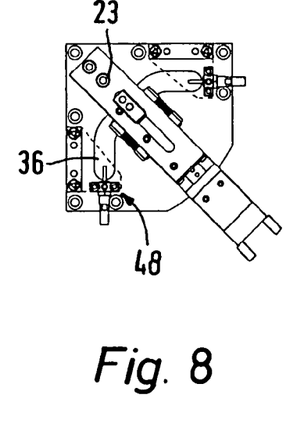
Figure 9:
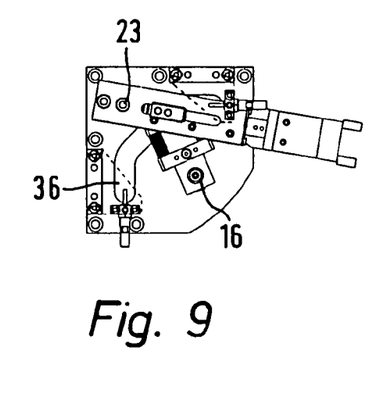
Figure 10:
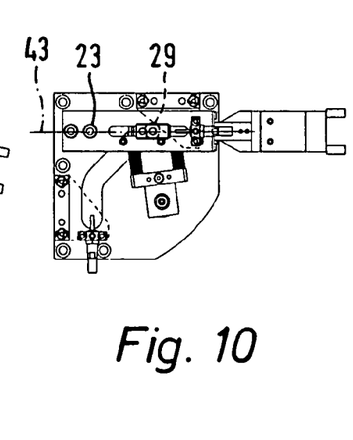
Figure 11:
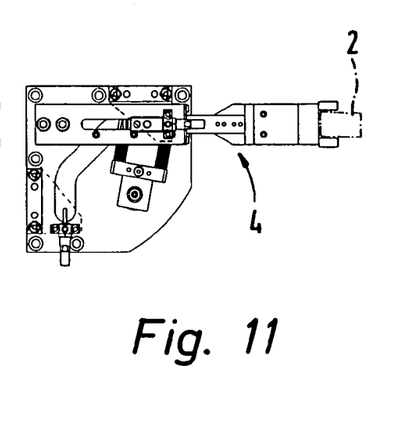
Figures 12, 13:
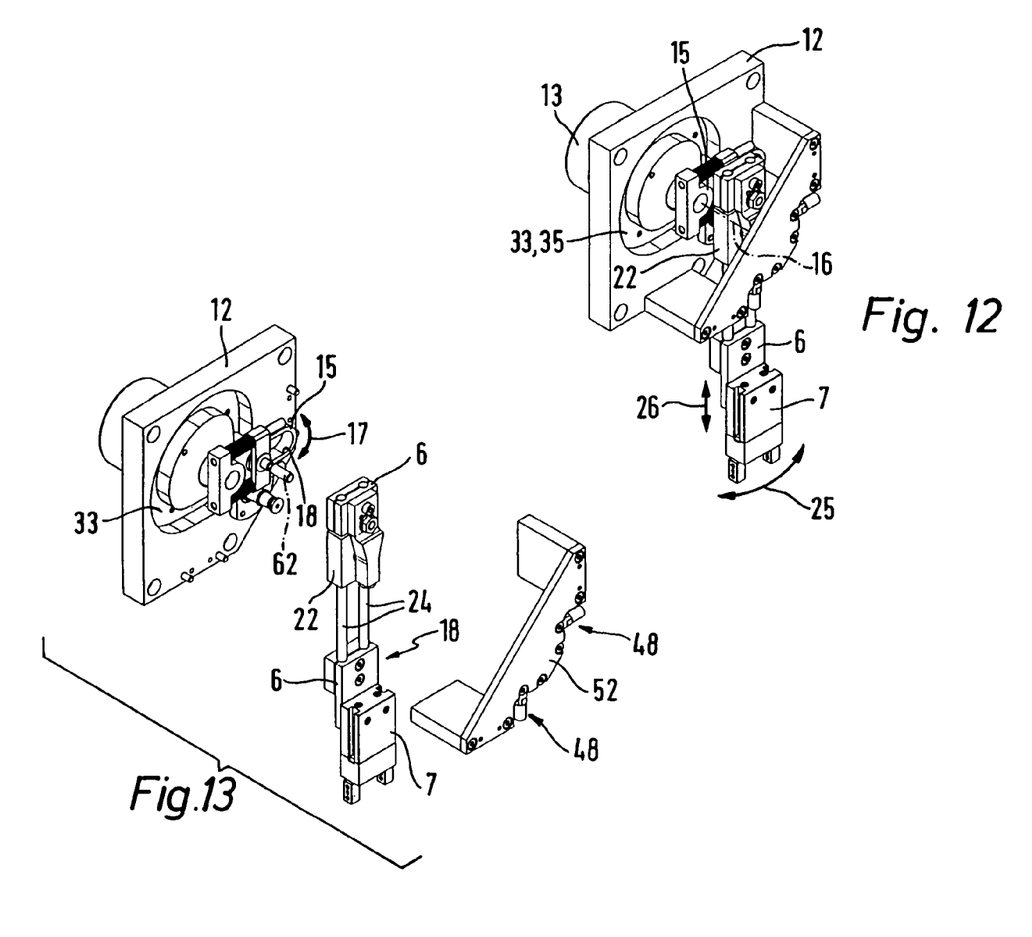
FIG. 12 shows a further possible design of the handling device in a perspective view.
FIG. 13 is an exploded elevation of the handling device as in FIG. 12.
Figure 14:
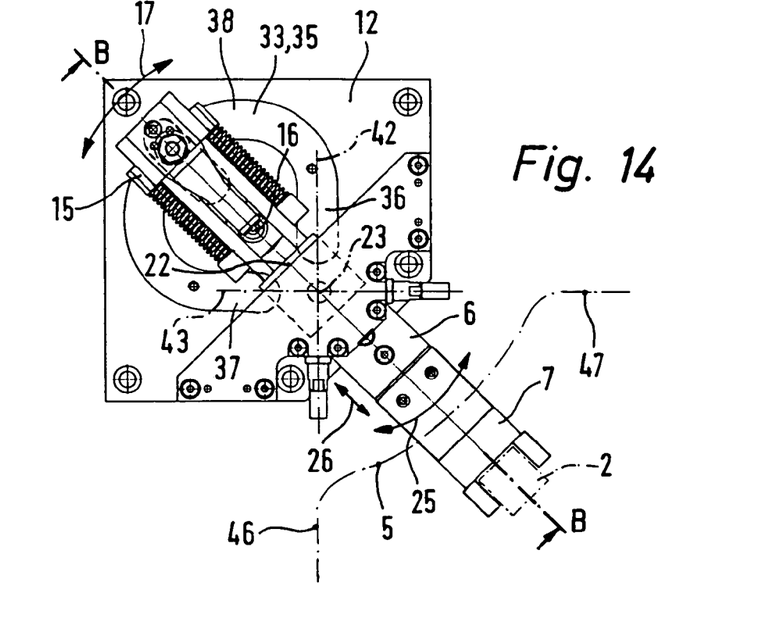
FIG. 14 is a front view of the handling device as in FIG. 12.
Figure 15:
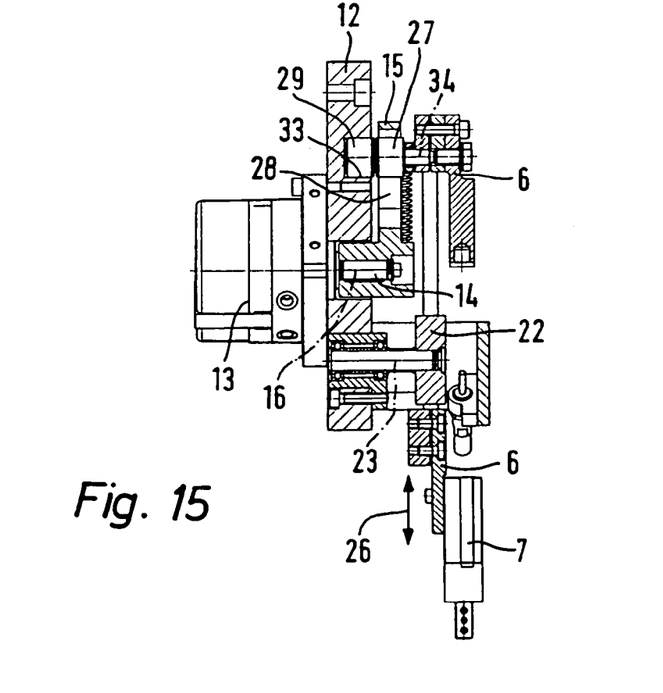
FIG. 15 is a section taken through the handling device on the section line B—B in FIG. 14.
Figure 16:
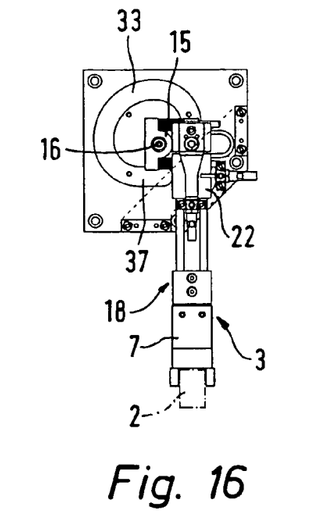
Figure 17:
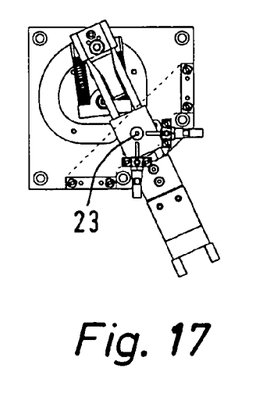
Figure 18:
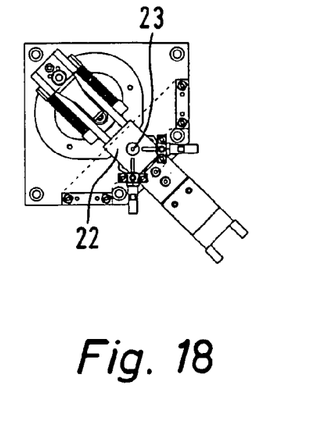
Figure 19:
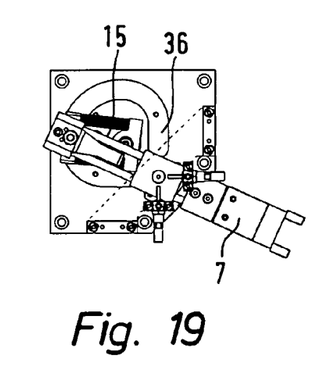
Figure 20:
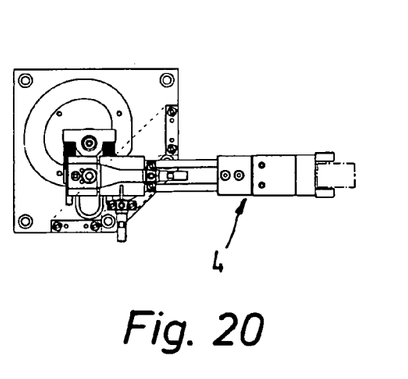

Such handling devices are so designed that the part 2 is able to be shifted during a repositioning operation between a first end position 3 indicated in FIGS. 5 and 16 and a second end position 4 indicated in FIGS. 11 and 20, the curve of its movement corresponding to the course of a handling path 5 being marked in chained lines in FIGS. 3 and 14 as followed by a driven handling part 6, which is fitted with a gripper 7, of some suitable type, serving for releasable holding the part 2 to be repositioned.

The gripper 7 may for example be a tongs-like gripper, which has pivoting jaws or jaws moved parallel to themselves, and which are able to be electrically actuated or, preferably, by fluid power to hold or release a part 2 as required. Further possible designs of the grippers 7 would for instance be suction or magnetic grippers, for the part 2 to be handled by vacuum or by magnetic force.

The handling device 1 comprises as a principal feature a preferably platform-like support body 12, which at the rear side bears a drive means 13 in the form of a single fluid operated rotary drive. A drive shaft 14 of the drive means 13 extends through the support body 12 and bears a pivot arm 15 arranged at the front side of the support body 12, such pivot arm extending radially from it. The rotary drive could also be adapted for electrical operation.

By activating the drive means 13 the drive shaft 14 may be driven to perform a reciprocating rotary movement about its longitudinal axis, such longitudinal axis simultaneously constituting a first pivot axis 16, in relation to which the pivot arm, locked in rotation with the drive shaft 14, and accordingly being able to be driven to perform an oscillating first pivotal movement 17 about the first pivot axis 16.

The handling part 6 is a component of a pivotally moving handling arm 18. Same comprises, in addition to the handling part 6 a bearing part 22. By way of the bearing part 22 the handling part the handling arm 18 is supported on the support body 12 for pivoting about a second pivot axis 23. The handling part 6 is—by way of suitable linear guide means 24 (which may for example comprise, inter alia, a guide rail or a plurality of guide rods)—supported on the bearing part 22 in an adjustable manner for motion in a direction which is radial in relation to the second pivot axis 23.

Accordingly the handling part 3 is able to be pivoted about the stationary second pivot axis 23 to perform a second pivoting movement 25 and is furthermore, while performing a linear stroke movement 26, able to be moved linearly in relation to the second pivot axis 23. The second pivoting movement 25 and the linear stroke movement 26 may overlap one another.

Figure 4:
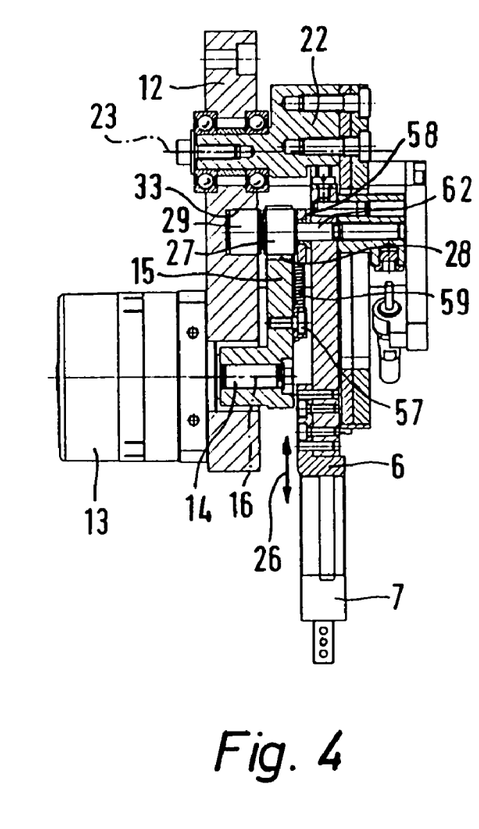
FIG. 4 shows a section taken through the arrangement of FIG. 3 on the cross section line A—A.

The handling part 6 is drivingly coupled with the pivot arm 15 so that during the first pivotal movement 17 of the pivot arm 15 it is entrained in a predetermined manner. The driving coupling effect is produced by an entrainment member 27 arranged on the bottom side, facing the support body 12, of the handling part 6, such entrainment member being coupled with the pivot arm 15 in a driving manner. For this purpose the pivot arm 15 possesses a slot 28 extending in its longitudinal direction and arranged radially in relation to the first pivot axis 16, the entrainment member 27 fitting into such slot. As shown in FIGS. 3 and 4 the slot 28 may be open at the outer end directed away from the first pivot axis 16 so that the pivot arm 15 is bifurcated.

The entrainment member 27 may be a roller body arranged rotatably on the handling part 6 with its axis of rotation extending in parallelism to the first pivot axis 16.

If the pivot arm 15 performs a first pivotal movement 17 the flank, which at the time is facing in the pivoting direction, of the slot 28 will act on the entrainment member 27 and will entrain the handling part 6 with it.

Figure 21:
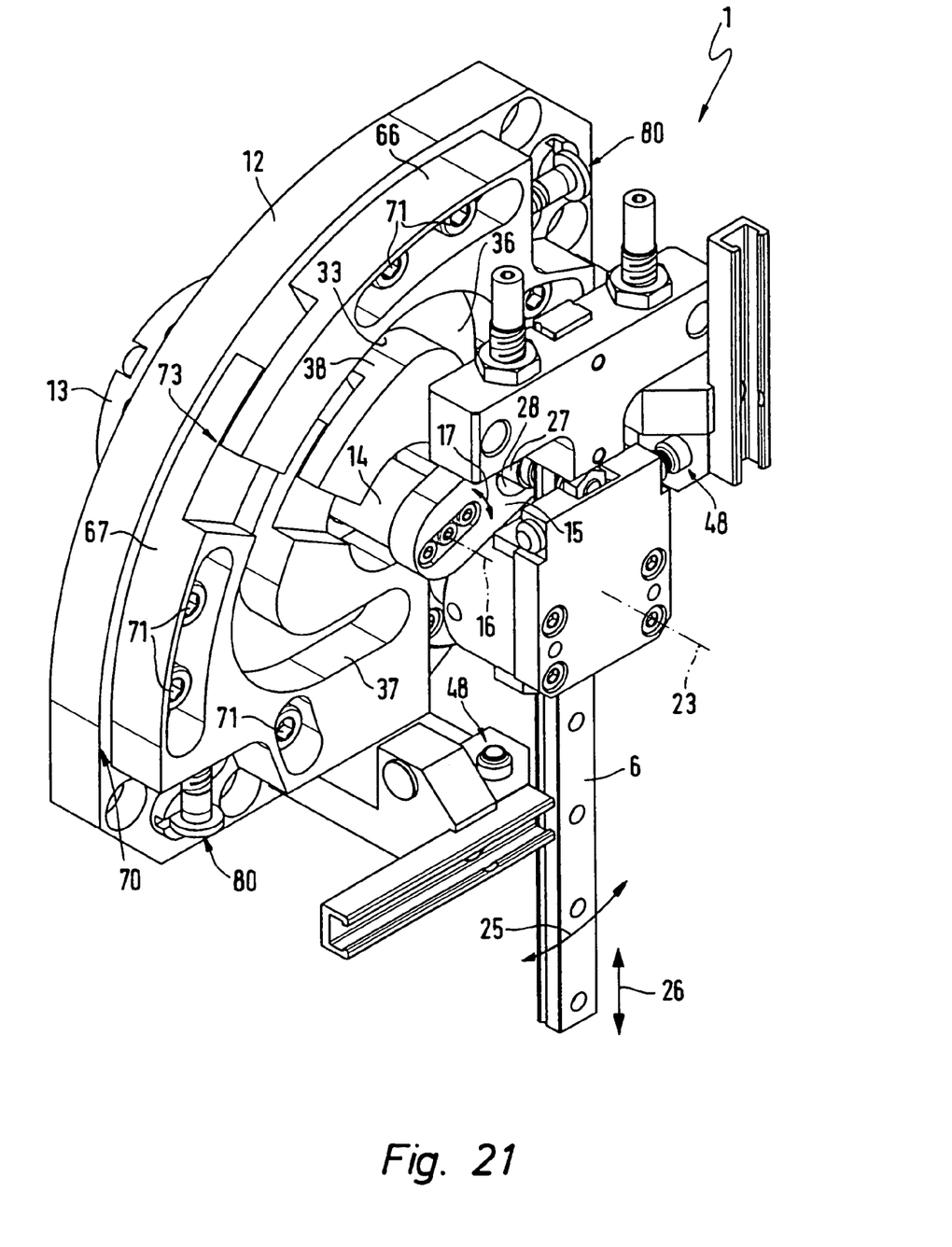
FIG. 21 shows a further advantageous design of the handling device in a perspective view.
Figure 22:
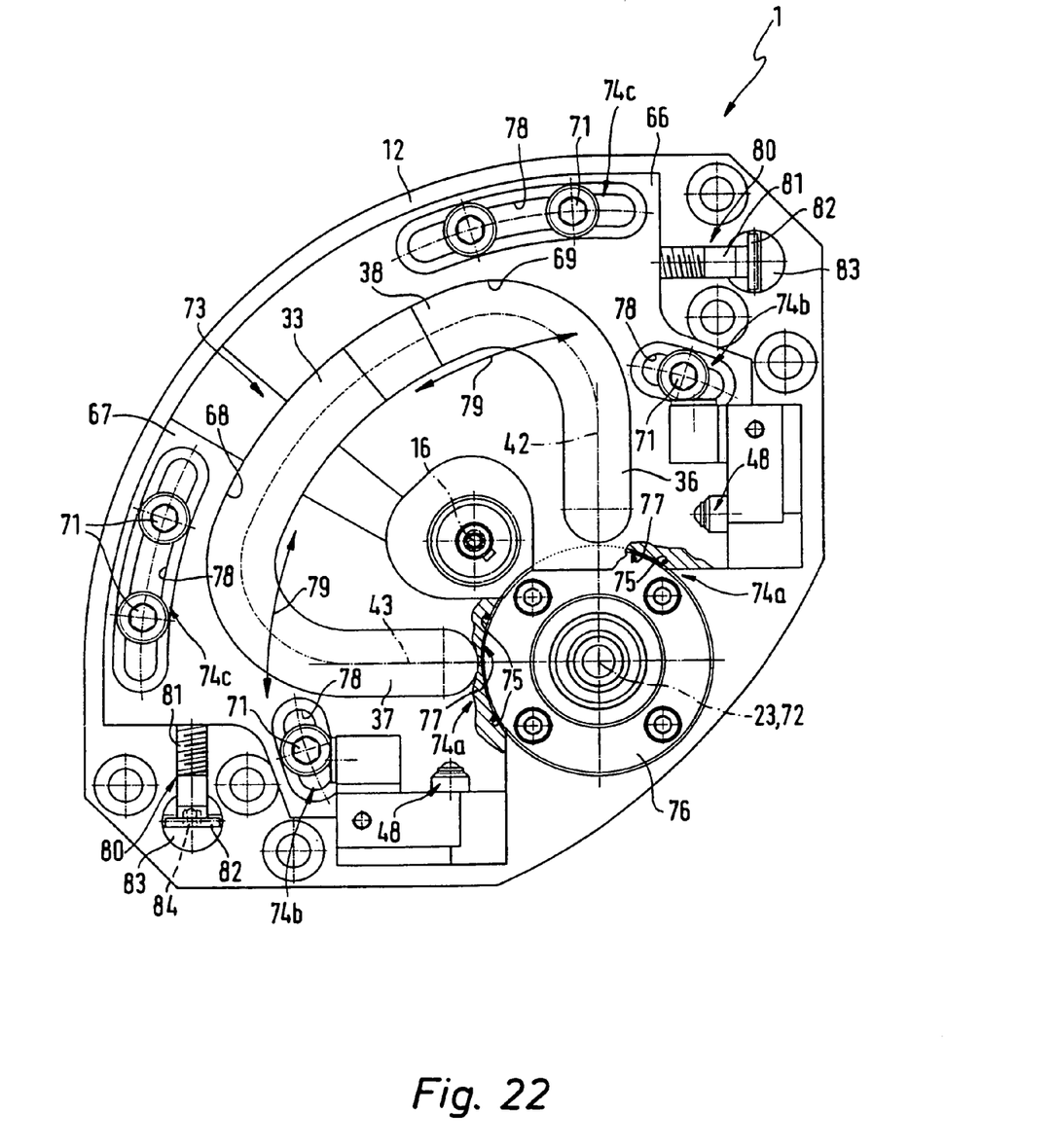
FIGS. 22 and 23 show in each case a front view of the handling device in different angular position of the linear terminal sections of the path setting cam.
Figure 23:
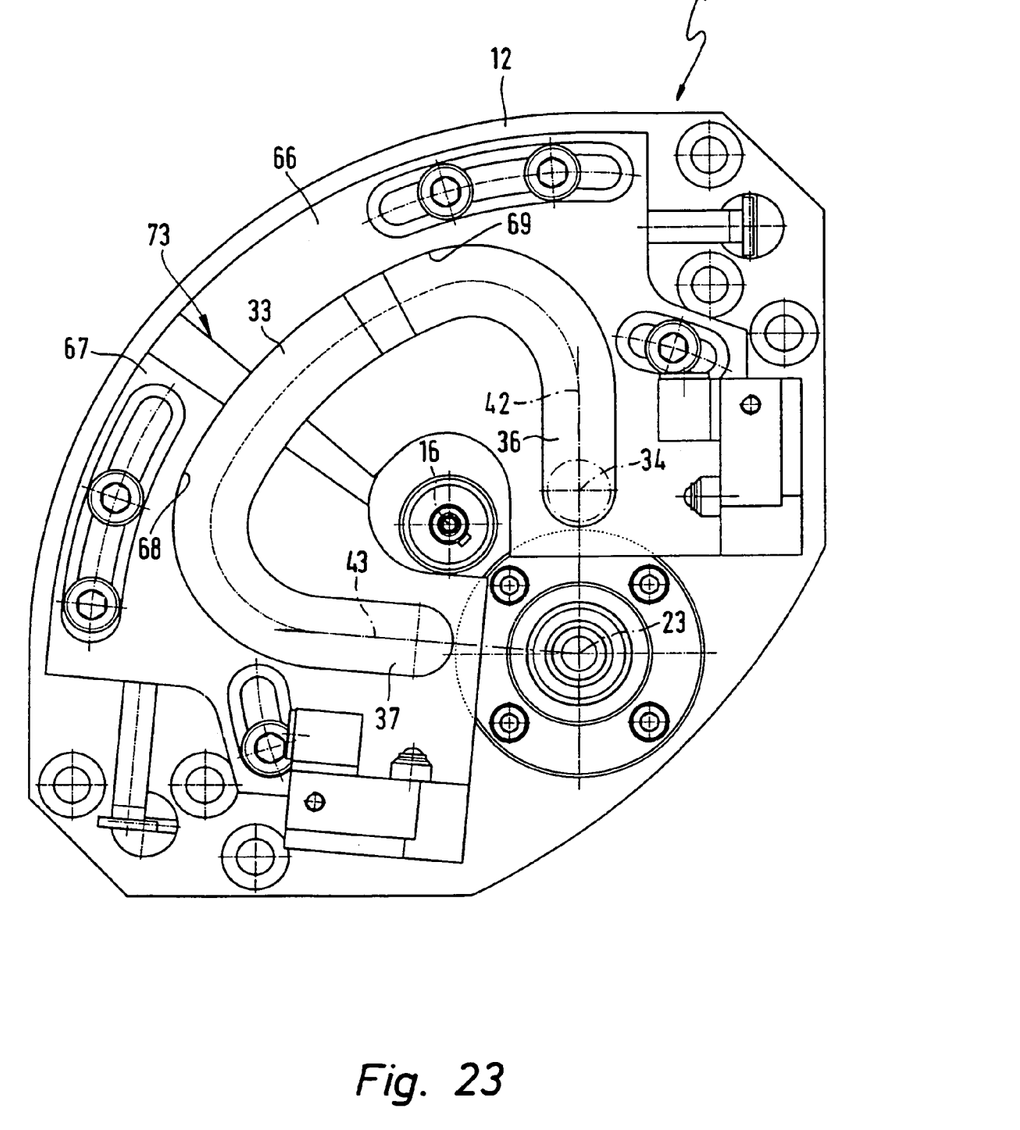

Furthermore on the handling part 6 a cam follower 29 is arranged, which follows a path setting cam 33 extending for at least some distance about the first pivot axis 16. Preferably, the entrainment member 27 and the cam follower 29 lie on a common entrainment axis 34 one after the other, such axis extending in parallelism to the two pivot axes 16 and 23. The cam follower 29 is best constituted by a roller body carried by anti-friction bearing means, which fits in a longitudinal slot 35 constituting the path setting cam 33 and so engages the cam. The longitudinal slot 35 and accordingly the path setting cam 33 are, in the working example of figures through 20, located directly on the support body 12, the cam follower 29 being in front of the entrainment member 27 toward the support body 12. In the case of FIGS. 21 through 23 the path setting cam 33 is provided on separate cam members 66 and 67 fixed to the support body 12.

When the pivot arm 15 is pivoted by the drive means 13, it will entrain the entrainment member 27, which is secured to the handling part 6, and will simultaneously shift the cam follower 29 along the path setting cam 33. In accordance with the form of the cam the distance of the cam follower 29 from the first pivot axis 16 and the second pivot axis 23 may change. Accordingly the handling part 6 will move along the above mentioned handling path 5, the course of the handling path 5 being dependent on the arrangement and the course of the path setting cam 33.

The path setting cam 33 has a curved longitudinal shape and possesses at its two first and second terminal sections 36 and 37 at least two length sections with a linear extent. The two terminal sections 36 and 37 are connected by means of an intermediate section 38 with each other, such intermediate section also having a linear course in the working example of FIGS. 1 through 11 and in the case of the working examples of FIGS. 12 through 20 and of FIGS. 21 through 23 it has a continuously curved form. In the case of FIGS. 21 through 23 the arcuate curvature changes along the length of the path setting cam 33 between the two terminal sections 36 and 37.

In the case of first two working embodiments the linear terminal sections 36 and 37 are at a right angle to one another, their longitudinal axes 42 and 43 meeting at a common point, which coincides with the second pivot axis 23. The angle of 90° is in this case set permanently. In the working embodiment illustrated in FIGS. 21 through 23 the angle between the two terminal sections 36 and 37 is able to be adjusted, it being set in the case of FIG. 22 at 90° and in FIG. 23 at approximately 85°. Independently of the angle set the longitudinal axes 42 and 43 meet at a common point on the second pivot axis 23 here as well. The position of the point of intersection is hence constant and independent of the angular setting.

In the case of working embodiment of FIGS. 1 through 11 the path setting cam 33 extends between the first pivot axis 16 and the second pivot axis 23, the first pivot axis 16 being located on the concave side of the path setting cam 33 and the second pivot axis being located on the convex side of the path setting cam 33. The closed ends of the linear terminal sections 36 and 37 in this case are directed away from the second pivot axis 23. In relation to the first pivot axis 16 the path setting cam 33 has an angular extent of approximately 120°.

In the working embodiments illustrated in FIGS. 12 through 20 and FIGS. 21 through 23 the first pivot axis 16 is respectively placed between the path setting cam 33 and the second pivot axis 23. Both pivot axes 16 and 23 lie on the concave side of the path setting cam 33. Compared with the other working example the path setting cam is somewhat longer, the angular extent about the first pivot axis 16 being of the order of 270°. While the first pivot axis 16 lies in the inner region enclosed by the generally completely closed path setting cam 33, the second pivot axis 23 is located in the open region, located between the two linear terminal sections 36 and 37, of the path setting cam 33, the closed ends of such linear terminal sections 36 and 37 facing the second pivot axis 23.

In the initial position of the handling device the handling part 6 assumes the first terminal position illustrated in FIGS. 5, 16 and 21. The cam follower 29 is in this case located at the outer end of the first terminal section 36 of the path setting cam 33. In order to implement a handling cycle the pivot arm 15 is driven by the drive means 13 to perform a unidirectional pivotal movement, the cam follower 29 running along the path setting cam 33 until it arrives at the closed end of the second terminal section 37 of the path setting cam 33. The handling part 6 is then located in the second terminal position illustrated in FIGS. 11 and 20.

The individual instantaneous showings of a handling cycle in FIGS. 5 through 11 on the one hand and FIGS. 16 through 20 on the other hand relate to the handling device illustrated in FIGS. 1 through 4 and, respectively, FIGS. 12 through 15. In this case there are essentially the following stages:

Starting from the first terminal position 3 the cam follower 20 initially moves linearly along the first terminal section 36, something which owing to the second pivot axis 23 placed in the linear prolongation of the terminal section means that the handling arm 18 and therefore furthermore the handling part 6 does not perform any pivotal movement. The bearing part 22 does not turn and the handling part 6 exclusively performs a linear or straight stroke movement 26 in a first stroke direction 44 until the cam follower 29 reaches the transition region leading to the adjoining intermediate section 38 of the path setting cam 33. The handling part 6 accordingly in this initial phase of movement performs a completely linear movement, whose consequence is that the handling path 5 has a first linear terminal section 46. Owing to this movement phase it is possible for example for a part 2 to be repositioned to be taken from an offering means. The terminal point of this first, completely linear movement phase is illustrated for the working embodiment of FIGS. 1 through 4 in FIG. 6. In the diagram of movements of FIGS. 15 through 20 this phase is not depicted.

In the next phase of movement the cam follower 29 driven by the pivot arm 15 performing a pivoting movement moves through an intermediate section 38 of the path setting cam 33, the entire handling arm 18, see FIGS. 7 through 9 and 17 through 19, being pivoted bodily about the pivot axis 23. In accordance with the longitudinal course of the section 38 the handling part 6 can maintain its radial distance from the second pivot axis 23 without any change but it may perform a linear stroke movement combined with the pivotal movement.

This movement phase is concluded when the cam follower 29 arrives in the transition zone between the intermediate section 38 and the second terminal section 37 of the path setting cam 33. This intermediate stage is not illustrated in the diagram of movements in FIGS. 16 through 20, but however appears from FIG. 10. In this intermediate position the cam follower 29 is on the longitudinal axis 43, cutting the second pivot axis 23, of the second terminal section 37 of the path setting cam 33.

In the following last phase there is again no pivoting, as in the initial phase of movement, of the handling arm 18 and hence of the handling part 6. While the bearing part 22 is not rotating, the handling part 6 performs a linear stroke movement 26 in a second stroke direction 45, which is opposite to the first stroke direction 44. When the handling part 6 in the movement in the second stroke direction 44 has drawn close to the second pivot axis 23, it moves away from the second pivot axis 23 in the second stroke direction 45.

The handling path thus has an again exclusively linear second terminal section 47. This last movement phase is suitable for depositing the part 2, initially taken up in the first terminal position 3, in the second terminal position as part of a linear plugging movement.

If the pivot arm 15 is then pivoted back in the opposite direction into the initial position, the handling part 6 will move along the handling stroke 5 in the same manner but in the opposite direction.

The angle between the two linear terminal sections 36 and 37 may, in accordance with the particular application, be a different angle which is permanently set. Such a design is then appropriate, when the path setting cam 33 is designed as part of the support body 12 to reduce the number of components, as for example in a manner similar to the structure of FIGS. 1 through 20. However, a design is particularly advantageous in accordance with the above possibility in which the angle defined between the longitudinal axes 42 and 43 of the two linear terminal sections 36 and 37 may be adjusted, more especially steplessly, as is the case with the working example of FIGS. 21 through 23 as a preferred embodiment.

In the design in accordance with FIGS. 21 through 23 the path setting cam 33 is on two more particularly plate-like cam members 66 and 67 which are adjustable as regards the support body 12 which is responsible for the stationary arrangement of the first and the second pivot axis 16 and 23, each of the two cam members 66 and 67 bearing one of the two linear terminal sections 36 and 37 and furthermore a longitudinal section 68 and 69 of the intermediate section 38. Preferably, the cam members 66 and 67 are provided on the front face 70, facing the handling arm 18, of the support body 12 and fixed there in the set position releaseably with respect to the support body 12.

The two cam members 66 and 67 are mutually independently able to be pivoted about the same pivoting center 72, such pivoting center 72 lying on the second pivot axis 23 and practically representing a further pivot axis, which coincides with the second pivot axis 23.

It is in this manner that the position of the common meeting point of the two longitudinal axes 42 and 43 remains the same on the second pivot axis 23 regardless of the respective angular setting.

By suitable adjustment of one or of both cam members 6 and 67 the angular position of the two linear terminal sections 46 and 47 of the desired handling stroke 5 may be varied. Accordingly, for example, the fact may be taken into account that the parts to be repositioned are often supplied with an oblique setting and therefore for reception by the handling arm require a certain angular adjustment. Moreover, on installation of the handling device an extremely simple adaptation may be performed to suit local requirements and more particularly manufacturing inaccuracies may be compensated for.

In principle the handling device could be so designed that only one of the two linear terminal sections of the path setting cam is able to be adjusted to the support body 12 in its angle, whereas the other remains at the same angle. However, a design is substantially more adaptable in which linear terminal sections 36 and 37 of the path setting cam are respectively individually adjustable independently from the respectively other terminal section by respective adjustment of the associated cam member 66 and 67.

In order to render this possible in the working example the two cam members 66 and 67 are respectively secured by their own holding screws 71 on the support body 12. Each cam member 66 and 67 may, when its holding screws 71 are released, be pivoted about the center 72 of pivoting even if the other cam member is still held fast in relation to the support body 12.

The two cam members 66 and 67 are more particularly so arranged that at least adjacent to the path setting cam 33 they overlap in the longitudinal direction of the cam. The extent of overlap depends on the actually assumed relative position. Then an uninterrupted form of the path setting cam 33 irrespectively of the extent overlap is ensured and practically solely the length of the intermediate section 38 changes owing to larger or smaller extent of overlap of the length sections 68 and 69. The extent of overlap of the two cam members 66 and 67 is indicated at 73.

The pivotal support of the cam members 66 and 67 is best effected by having arcuate guide means 74*a*, 74*b* and 74*c*, whose center lies in the center 72 of pivoting. First arcuate guide means 74*a* in the working example comprise a circularly arcuate, convex surface 75 of a preferably cylindrical attachment flange 76 which is centered on the pivot axis 23 and which is secured to the front face 76 of the support body 12. Engaging this surface 75 there are circularly arcuate guide faces 77, which are concave in a complementary manner, and which can slide on the surface 75. In lieu of being on the attachment flange 76 the surface 75 could be provided on some other part provided on the support body 12.

The further circularly arcuate guide means 74*b* and 74*c* comprise, in the case of the working example, circularly arcuate slots 78 extending through the cam members 66 and 67, through which holding screws 71 extend in the form of set screws, which have their heads engaging the front side of the cam member 66 and 67 and having their shanks screwed into the support body 12.

When the holding screws 71 of a cam member 66 and 67 are released, the cam member 66 and 67 may be moved, as indicated by the double arrows 79, in relation to the support body 12, the guide faces 77 sliding along the outer face 75.

In order to provide for fine adjustment of the desired angle the two cam members 66 and 67 are best provided with an adjustment device 80. In the working embodiment illustrated this device has a respective adjustment screw 81, which extends in parallelism to the pivot plane and more particularly is screwed into one of the two end faces orientated in the pivoting direction. Simultaneously an abutment collar 82 on it fits into the slot of a holding body 83 in a rotatable manner, such holding body being secured for pivoting motion about an axis of rotation parallel to the second pivot axis 23, on the cam member 66 and 67.

Each setting screw 81 has an actuating portion 84, preferably an abutment collar 82, which permits the application of a screw driver or wrench. If, when the holding screws 71 are released, the angular setting screw 81 is turned, the respective cam member 66 and 67 will be moved by the screwing action in relation to the setting screw 81 bearing against the holding body 83 in the one or the other direction of screwing, the rotatable holding body 83 allowing for the change in angle of the setting screw 81 necessary in this respect.

In order to deaden the impact of the handling part 6 on reaching the terminal positions the two linear terminal sections 36 and 37 of the path setting cam 33 are best provided with suitable shock absorber means 48. In the working embodiments they are respectively seated on a holder 52, which is attached to the front side of the support body 12 and which in the working examples of FIGS. 21 through 23 is respectively constituted by the cam members 66 and 67. The shock absorber means 48 are for example constituted by hydraulic shock absorbers and are aligned to be parallel to the longitudinal axes 42 and 43 of the linear terminal sections 36 and 37 so that the handling part can engage same near the end of the last phase of movement.

In the working embodiment illustrated the shock absorber means 48 cooperate with an abutment means 53, which is placed on the entrainment axis 34.

To the side adjacent to the one or both linear terminal sections 36 and 37 of the path setting cam 33 it is possible to provide abutment means 54, which are indicated in chained lines, and engage the support body 12 and which are engaged by the bearing part 22 in the terminal position at the side. These abutment means 54 are adjustable in order to ensure that they engage the bearing part in the terminal position in a manner such that the cam follower 29 is thrust against the remote flank 55 of the path setting cam 33. The abutment means 54 are best associated with the outer curvature side of the path setting cam 33 so that the cam follower 29 is thrust against the inner flank, adjacent to the inner curvature side, of the path setting cam 33. The handling arm is accordingly accurately set in the terminal position without any play.

In order to ensure movement free of play in the case of movement between the two terminal positions as well it is furthermore an advantage for the pivot arm 15 to be provided with a loading means 56 taking part in the pivotal motion, which takes effect between the pivot arm 15 and the cam follower 29 and which constantly biases the cam follower 29 against one flank of the path setting cam 33. Again it is conveniently the inner flank, adjacent to the inner curvature side, of the path setting cam 33, against which the cam follower 29 is constantly thrust in this case.

In the working embodiment the loading means 56 possesses a holding means 57 secured to the pivot arm 15, a loading part 58 moving in the longitudinal direction of the pivot arm 15 and a tension spring means 59 effective between the two.

The cam follower 29 is seated, together with the entrainment means 27, on the bearing shaft 62 which defines the entrainment axis 34 and is attached to the pivot arm 15, the bearing shaft 62 extending through a hole 63 in the loading part 58 and so that accordingly the loading force is transmitted by the loading part 58 to the bearing shaft 62.

The invention claimed is:

1. A handling device for the repositioning of parts comprising a pivot arm able to be driven by a drive means to perform an oscillating movement about a stationary first pivot axis, a handling part serving for carrying a gripper, which while performing a second pivot movement is able to be pivoted about a stationary second pivot axis and furthermore is able to be set radially in relation to the second pivot axis while performing a linear stroke, and further comprising a path setting cam extending at least partly around the first pivot axis, and having two linear terminal sections, the handling part including a cam follower being engaged with the path setting cam and an entrainment member coupled to the pivot arm such that, the cam follower is able to be moved radially by the pivot arm with respect to its first pivot axis and the pivot arm so acts, during its first pivoting movement, in a driving manner on the cam follower that same is shifted along the path setting cam and accordingly the handling part moves, during each handling cycle, along a handling path, which has two linear terminal sections, in which the handling part respectively performs exclusively a linear stroke.

2. The handling device as set forth in claim 1, wherein the two linear terminal sections of the path setting cam extend at a right angle to one another.

3. The handling device as set forth in claim 1, wherein the longitudinal axes of the two linear terminal sections of the path setting cam meet at a common point on the second pivot axis.

4. The handling device as set forth in claim 1, wherein the entrainment member is kinematically coupled with the pivot arm in the direction of the first pivotal movement while being able to move radially in relation to the first pivot axis in relation to the first pivot axis.

5. The handling device as set forth in claim 4, wherein the cam follower and the entrainment member lie in sequence on a common entrainment axis parallel to the first and the second pivot axis.

6. The handling device as set forth in claim 1, further comprising a handling arm having said handling part movably supported thereon and a loading means pivoting with the pivot arm and which takes effect between the pivot arm and the cam follower and biases the cam follower constantly against a flank of the path setting cam.

7. The handling device as set forth in claim 1, wherein the handling part is a component of a pivotally moving handling arm, the handling arm additionally having a bearing part able to pivot to define the second pivot axis, and a linear guide means provided on said bearing part, wherein the handling part is supported on said linear guide means in a linearly adjustable manner with respect to said bearing part for the definition of the axis of the linear stroke movement.

8. The handling device as set forth in claim 7, wherein the path setting cam is of slotted design and the cam follower fits into the path setting cam, and to the side adjacent to at least one of the linear terminal sections of the path setting cam, abutment means are provided, on which in the terminal position the bearing part rests laterally, the abutment means being adjustable so that the cam follower is thrust against the flank on the other side of the path setting cam.

9. The handling device as set forth in claim 1, further comprising shock absorber means, which are associated with the two linear terminal sections of the path setting cam and cooperate with the handling part, when same moves into the respective terminal position as part of the linear stroke movement.

10. The handling device as set forth in claim 1, wherein the path setting cam extends between the first and the second pivot axis, the first pivot axis being located on the concave side of the curvature and the second pivot axis being located of the convex side of the curvature.

11. The handling device as set forth in claim 1, wherein the linear terminal sections of the path setting cam have respective longitudinal axes which meet at a common point coinciding with the second pivot axis, the linear terminal sections having their closed ends facing away from the second pivot axis.

12. The handling device as set forth in claim 1, wherein the first pivot axis is placed between the path setting cam and the second pivot axis.

13. The handling device as set forth in claim 1, wherein the linear terminal sections path setting cam have respective longitudinal axes which meet at a common point coinciding with the second pivot axis, the sections having their closed ends directed toward the second pivot axis.

14. The handling device as set forth in claim 12, wherein the first pivot axis is approximately surrounded by the path setting cam, the second pivot axis being attached in an open region between the two linear terminal sections of the path setting cam.

15. The handling device as set forth in claim 1, wherein said path setting cam comprises two cam members, said cam members being adjustable so that the angle between the two linear terminal sections of the path setting cam may be varied.

16. The handling device as set forth in claim 15, wherein at least one of the two linear terminal sections of the path setting cam is able to be pivoted about a pivot center lying on the second path setting cam in relation to the respectively other linear terminal section and is able to be positioned in a different angular position.

17. The handling device as set forth in claim 16, wherein the longitudinal axes of the two linear terminal sections of the path setting cam intersect with the second pivot axis irrespectively of the instantaneous angular position.

18. The handling device as set forth in claim 16, wherein the pivoting terminal section of the path setting cam is located on a cam member which is pivotally arranged on a support member in relation to which the first and the second pivot axis are arranged in a stationary fashion, the pivot center being preferably arranged on the second pivot axis.

19. The handling device as set forth in claim 18, wherein the two linear terminal sections of the path setting cam are provided on separate, cam members able to be set independently from each other in relation to the support body.

20. The handling device as set forth in claim 18, comprising circularly arcuate guide means for pivotally bearing the respective cam member in relation to the support body.

21. A handling device for the repositioning of parts comprising:
a support body;
a drive means disposed on said support body;
a pivot arm driven by said drive means to perform an oscillating pivoting movement about a stationary first pivot axis;
a path setting cam supported on said support body, said path setting cam defining a path extending at least partially around said first pivot axis and having two linear terminal sections;
a handling arm including a cam follower engaged with said path setting cam and an entrainment member coupled to said pivot arm, said handling arm being driven by said pivot arm about a stationary second pivot axis, wherein said cam follower moves along the path defined by said path setting cam; and
a handling part movably carried by said handling arm, said handling part being coupled to said handling arm cam follower such that said handling part pivots with said handling arm about said second pivot axis and translates linearly with respect to said handling arm when said cam follower moves along said linear terminal sections of said path defined by said path setting cam.

\* \* \* \* \*